(12) United States Patent
Hitz et al.

(10) Patent No.: US 10,377,216 B2
(45) Date of Patent: Aug. 13, 2019

(54) BATTERY CARRIER WITH IMPROVED CRASH PROPERTIES

(71) Applicant: Benteler Automobiltechnik GmbH, Paderborn (DE)

(72) Inventors: Andreas Hitz, Erwitte (DE); Christian Handing, Langenberg (DE); Thomas Olfermann, Salzkotten (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/892,929

(22) Filed: Feb. 9, 2018

(65) Prior Publication Data
US 2018/0229593 A1 Aug. 16, 2018

(30) Foreign Application Priority Data
Feb. 10, 2017 (DE) .......... 10 2017 102 699

(51) Int. Cl.
*B60K 1/04* (2019.01)
*B60L 3/00* (2019.01)
*B62D 25/20* (2006.01)
*H01M 2/10* (2006.01)
(Continued)

(52) U.S. Cl.
CPC .......... *B60K 1/04* (2013.01); *B60L 3/0007* (2013.01); *B60L 3/0046* (2013.01); *B60L 50/64* (2019.02); *B60L 50/66* (2019.02); *B62D 25/20* (2013.01); *H01M 2/1077* (2013.01); *H01M 2/1083* (2013.01); *B60K 2001/0438* (2013.01); *B60K 2001/0472* (2013.01); *B60Y 2306/01* (2013.01); *H01M 2220/20* (2013.01)

(58) Field of Classification Search
CPC .......... B60K 1/04; B60K 2001/0438; B60K 2001/0405; B60K 2001/0416; B60K 2001/0472; B60L 3/0007; B60L 3/0046; B60L 50/64; B60L 50/66; B62D 25/20; H01M 2/1077; H01M 2/1083; H01M 2/1016; H01M 2/1005; H01M 2220/20; B60Y 2306/01
USPC ........................................ 180/68.5
See application file for complete search history.

(56) References Cited

U.S. PATENT DOCUMENTS 5,558,949 A * 9/1996 Iwatsuki ............. H01M 2/1083
180/68.5
9,061,712 B2 * 6/2015 Patberg ................ B62D 21/157
9,254,609 B2 2/2016 Choi et al.
(Continued)

FOREIGN PATENT DOCUMENTS

DE 102011051698 A1 1/2013
DE 102011086813 A1 5/2013

OTHER PUBLICATIONS

German Office Action for Application No. 10 2017 102 699.1, dated Oct. 27, 2017, 10 pp.

*Primary Examiner* — John D Walters
(74) *Attorney, Agent, or Firm* — Hauptman Ham, LLP

(57) ABSTRACT

A battery carrier for an electric motor vehicle is disclosed having a trough for receiving at least one battery. The trough is produced in the form of a formed sheet-metal component deep-drawn from a hardenable steel material with a base and walls arranged at an angle to the base. The load paths arising in the trough are hardened locally, and/or connecting points for struts arranged in the trough are hardened locally.

15 Claims, 5 Drawing Sheets

(51) Int. Cl.
*B60L 50/60* (2019.01)
*B60L 50/64* (2019.01)

(56) References Cited

U.S. PATENT DOCUMENTS

| | | |
|---|---|---|
| 2012/0301765 A1 | 11/2012 | Loo et al. |
| 2014/0117716 A1 | 5/2014 | Patberg et al. |
| 2014/0193659 A1 | 7/2014 | Lanzerath et al. |

* cited by examiner

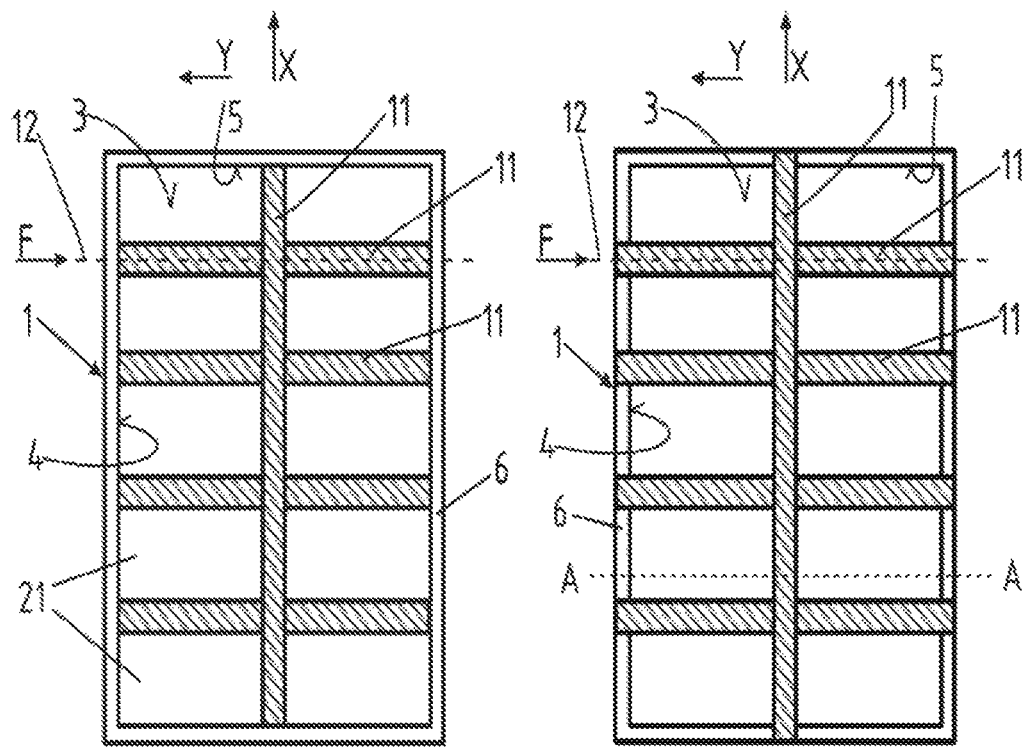
Fig. 3
Fig. 4
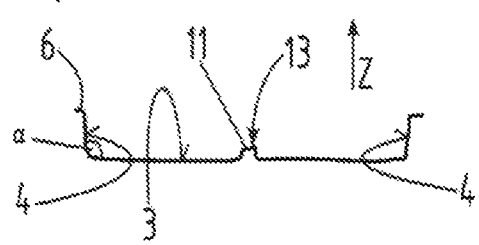
Fig. 5A)
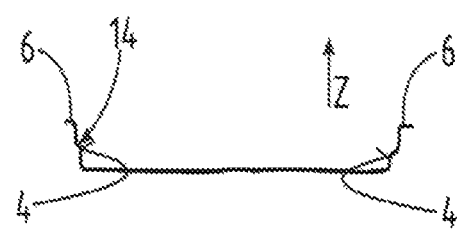
Fig. 5B)

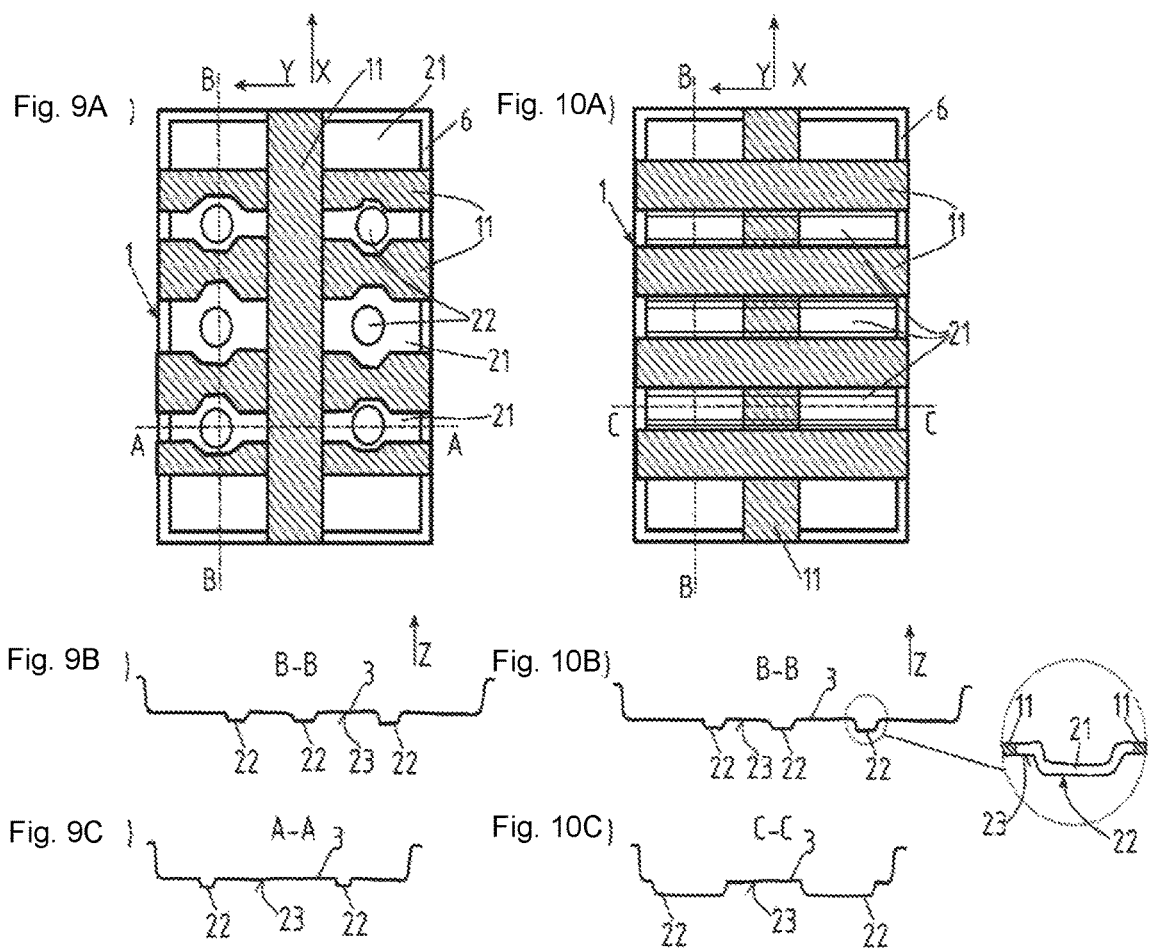

BATTERY CARRIER WITH IMPROVED CRASH PROPERTIES

RELATED APPLICATIONS

The present application claims the priority of German Application Number 10 2017 102 699.1 filed Feb. 10, 2017, the disclosure of which is hereby incorporated by reference herein in its entirety.

BACKGROUND

1. Field of the Invention

The disclosure is related to a battery carrier, and more specifically, to a battery carrier for an electric motor vehicle.

2. Description of the Related Art

The use of electric motor vehicles has been increasingly noted in the prior art. The electrical energy required for propelling the motor vehicle is stored in this case in batteries, also called accumulators. In order to achieve an acceptable range of up to several hundred kilometers, the electric motor vehicle has to carry a certain number of battery surfaces of large volume, with the batteries simultaneously having a high dead weight. For this purpose, the batteries are arranged in particular in the underfloor region of the electric motor vehicle.

Battery carriers, which are also known as battery housings or battery trays, are provided for receiving batteries in the underfloor region. A plurality of batteries are generally arranged in such a battery carrier and are electrically connected to one another. The battery carrier itself is then mounted under an electric motor vehicle.

A battery carrier is customarily formed from a trough and from a cover closing the trough. The trough itself is generally formed as a formed component from a metallic material.

SUMMARY

According to one exemplary embodiment, a battery carrier is provided for arranging on an electric motor vehicle. The battery carrier itself has a trough for receiving at least one battery, wherein the trough is produced in the form of a deep-drawn formed sheet-metal component from a hardenable steel material with a base and walls arranged at an angle to the base. The trough can optionally be closed by a cover.

According to an exemplary embodiment, the trough is distinguished in that load paths arising in the trough by means of in particular strip-shaped regions are hardened locally, and/or connecting points for struts arranged in the trough are hardened locally. The load paths are in particular load paths which, in the event of a head-on or side impact of the electric motor vehicle, arise through the trough. Consequently, the load paths crucially extend in the longitudinal direction of the motor vehicle or transverse direction of the motor vehicle, in each case over the entire length or width of the trough, but in particular not over the full surface, but rather in each case in a strip-shaped manner. It is therefore possible to produce the trough by direct or indirect hot forming and press hardening, wherein in particular the regions to be hardened are locally adjusted in temperature before the hot forming and are then press-hardened during the forming and subsequent quenching. A load path extending through the entire length or width of the trough in the longitudinal direction of the motor vehicle or in the transverse direction of the motor vehicle therefore has a greater hardness than the remaining regions of the trough. The deformation rigidity or rigidity against deformation in the event of a side or head-on crash is therefore increased.

In the event that struts are arranged within the trough, the connecting points for the struts in the trough are likewise hardened locally. The struts can serve here for stiffening the trough itself. However, the struts can also be arranged for receiving or fastening batteries in the trough. In particular the connecting points of the struts in the trough are correspondingly hardened.

In the event of a side crash or a head-on crash, the trough of the battery carrier therefore has increased rigidity and in particular reinforces the body of the electric motor vehicle. At the same time, however, the batteries located in the trough are also better protected against damage due to deformation in the event of a crash. By reinforcing the trough, the wall thickness can simultaneously be reduced while the strength at least remains the same, which firstly reduces the dead weight of the trough, but also the required material costs for producing the trough.

According to yet another exemplary embodiment, but which can also be combined with another battery carrier, a battery carrier for arranging on an electric motor vehicle is provided, wherein the battery carrier has a trough for receiving at least one battery, and the trough is produced in the form of a formed sheet-metal component deep-drawn from a metallic material, in particular a hardenable steel material, with a base and walls arranged at an angle to the base. A portion, in particular a front length portion of the trough in the longitudinal direction of the motor vehicle, has, according to the invention, a ductile design such that, in a head-on crash, the length portion of the trough is deformable or is deformed in the manner of a crash box or is deformed downwards or upwards, with respect to the vertical direction of the motor vehicle, consequently is bent over or bent down. In particular, parts of the power electronics or a corresponding temperature adjustment means or thermomanagement for the battery carrier are accommodated in the front length portion. Deformation of the front length portion therefore specifically converts crash energy into deformation work by means of deformation. However, a lateral portion or rear length portion can also be designed in the manner described above, and therefore, in the event of a side crash or rear impact, the battery carrier is specifically deformed.

At least one longitudinal strut is preferably arranged in the trough. A front length portion of the longitudinal strut is likewise designed in the manner of a crash box such that the length portion is deformed in the event of a head-on crash. The same applies to a lateral portion, but in conjunction here with a transverse strut. The respective strut can also be deformed by bending over or bending down.

All of the properties described below can be equally applied to both variant embodiments and can be combined with one another as desired.

Instead of a soft portion in the material, a formation can also be provided in the base, for example in the form of a ring or rectangle.

It is therefore provided that the trough is produced in particular from a steel material, preferably from hardenable steel material. For this purpose, use is made in particular of a hardenable steel alloy, for example a steel of type 22MnB5. The temperature thereof is partially adjusted prior to the hot forming. The partial temperature adjustment takes place, for example, in particular by means of contact heating. For this purpose, either the entire blank can be heated in a furnace to above AC3 temperature and then cooled locally, with other region being kept locally to above the AC3 temperature. Alternatively, it is also possible to heat only the regions which are intended to be hardened locally to a temperature above the AC3. In particular, the regions which are not to be hardened are at a temperature below AC3 when they are inserted into a hot forming tool. In particular, a temperature of lower than 700° C. is provided in the later regions which are not hardened or are not so greatly hardened. The regions which do not have the high strength requirements can also be cooled less severely or less rapidly in the press-hardening tool. However, it would be important in this connection for the locally hardened regions to be hardened more reliably in order to provide the load paths. It is also conceivable for the trough to first of all be pre-shaped cold and then to be press-hardened in the indirect hot forming method. For this purpose, the trough is partially adjusted in temperature following the cold pre-shaping and/or is partially press-hardened.

In particular, for this purpose, the local regions are of strip-shaped design. Strips can therefore extend transversely through the trough or longitudinally through the trough. Stiffening in the transverse direction of the motor vehicle or longitudinal direction of the motor vehicle is thereby provided.

Alternatively, the material of the trough can be brought to the austenitization temperature and temporarily cooled uniformly to a lower hot forming temperature<AC1 and can preferably have a zinc coating, wherein hardened and unhardened regions are brought about by a locally heated pressing tool.

The zinc coating is metallurgically bonded by the austenitization. In particular, liquid phase embrittlement is avoided in this case.

In the hardened regions, in particular a tensile strength Rm of greater than 1300 MPa, in particular greater than 1450 MPa and preferably greater than 1750 MPa is provided. However, the tensile strength is less than 3000 MPa. In the less hard or unhardened regions, a tensile strength Rm of between 500 and 1000 MPa, in particular of between 550 and 750 MPa, is provided.

In addition to the strips produced by local temperature adjustment, longitudinal beads and/or transverse beads formed in the base, but partially also in the wall, can furthermore be present in the trough. Furthermore preferably, the locally hardened regions are then formed at the same time in the longitudinal beads or transverse beads.

The locally hardened regions can be formed in particular in the base, but can also extend as it were into the wall. If the trough has a laterally protruding flange, the flanges can be soft in order to provide a good deep-drawing capability during the forming process. However, the regions hardened in the manner of strips can also extend into the respective flange.

According to yet another exemplary embodiment, the trough is designed in such a manner that the side walls of the trough converge with each other in an angled manner in a front part. A front length portion of the trough is of tapering design. In particular, the side walls converge with each other in an angled manner, preferably at an angle of 30 to 60 degrees, in particular of 40 to 50 degrees, very particularly preferably of 45 degrees. The side walls are furthermore preferably not connected to each other in a manner tapering to a point, but rather via a front end wall. The end wall itself runs in the transverse direction of the motor vehicle.

A further advantage is provided by the use of tailored blanks. These are in particular blanks having a wall thickness differing from one another and which are formed into the trough. Blanks having material properties which differ from one another in sections may also be used.

Furthermore, coated blanks can be used. Multilayer steels may also be used. In particular, such a multilayer steel has a hardenable central layer and external layers made of rust- and/or acid-resistant steel material.

Yet another advantage is that the encircling walls can be hardened. In this case, it is possible in particular to dispense with an additional frame encircling the outside or with a frame reinforcement of the battery carrier.

The trough which is produced can be part of the underbody of the body of the motor vehicle. The trough can also be closed with a cover. In particular, this can be a symmetrical cover trough. In this case, the depth of the trough or the height of the wall is not too large since the battery does not have to be mounted in a completely recessed manner in the trough, but rather part of the battery that protrudes at the top out of the trough is covered by the cover trough.

BRIEF DESCRIPTION OF THE DRAWINGS

For an understanding of embodiments of the disclosure, reference is now made to the following description taken in conjunction with the accompanying drawings, in which:

FIG. 3 shows a top view of a trough in accordance with an exemplary embodiment;

FIG. 4 shows a top view of a trough in accordance with an alternative embodiment;

FIGS. 5A and 5B show two cross-sectional views taken along line A-A in FIG. 4;

FIGS. 9A to 9C show an alternative refinement of the trough in top view and respective sectional view; and, FIGS. 10A to 10C show the top view and respective sectional views of the trough in accordance with an alternative embodiment.

In the figures, the same reference signs are used for identical or similar component parts, even if a repeated description is omitted for reasons of simplification.

DETAILED DESCRIPTION OF SOME EMBODIMENTS

Some embodiments will be now described with reference to the Figures.

Figure 1:
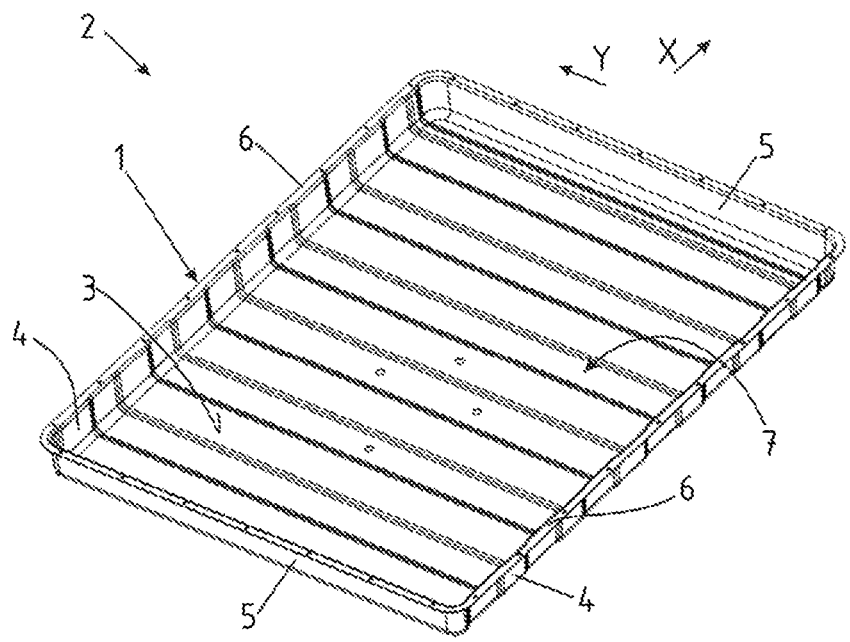
FIG. 1 shows a perspective view of a trough in accordance with one exemplary embodiment.

FIG. 1 shows a perspective view of a trough 1 for a battery carrier 2. The trough 1 has a base 3 lying at the bottom, and encircling walls 4, 5 protruding in relation to the base 3, called side walls 4 and end walls 5 in the following. In the following, two of the walls are side walls 4 and two of the walls are end walls 5. A flange 6 which can be produced during the deep drawing and/or can be used for the screwing to a cover (not illustrated specifically) in each case protrudes on the outside in relation to the walls 4, 5. In the variant embodiment according to FIG. 1, there are beads 7 running in a manner oriented in the transverse direction Y of the motor vehicle. The beads 7 run here over the entire transverse direction Y of the motor vehicle or width of the base 3 and optionally into the respective side wall 4. However, for forming reasons, the beads 7 may also peter out before the side walls.

Figure 2:
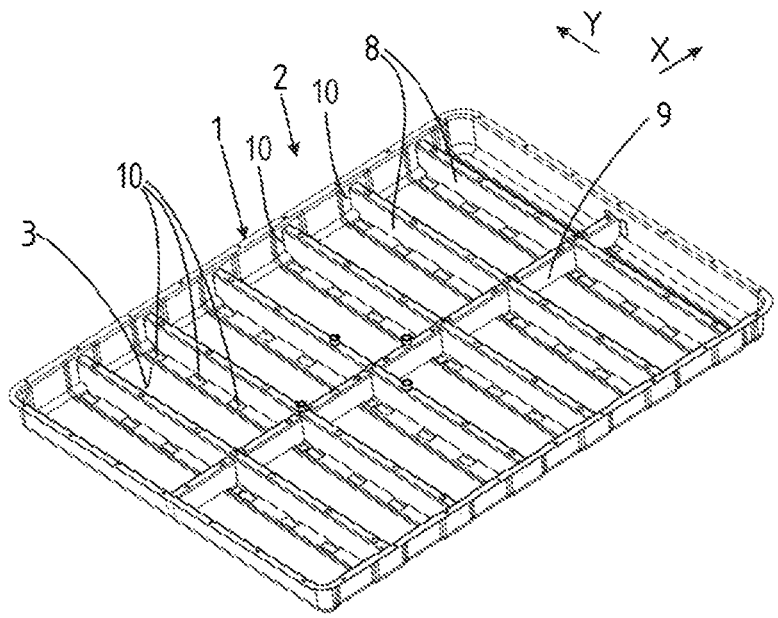
FIG. 2 shows the trough of FIG. 1 with struts.

FIG. 2 shows the trough 1 of the battery carrier 2 from FIG. 1 with transverse struts 8 arranged in the trough 1 and with a longitudinal strut 9. The transverse struts 8 likewise run in a manner oriented in the transverse direction Y of the motor vehicle here. The longitudinal strut 9 is arranged running in a manner oriented in the longitudinal direction X of the motor vehicle. According to the invention, the respective connecting points 10 on the base 3 or on the wall are preferably hardened locally. The trough 1 therefore has improved strength and rigidity during operation when struts are used. The connecting points 10 may be formed only locally or may run in each case over a large part of the width or length of the trough 1. FIG. 3 shows a further additional or alternative variant embodiment of the trough 1 in top view. Regions 11 which are hardened in the manner of strips and extend in the longitudinal direction X of the motor vehicle and in the transverse direction Y of the motor vehicle in the trough 1 are formed in the base 3 of the trough 1. In the event of a side crash, a force F would act on the side wall 4 and therefore a load path 12 through the trough 1 would arise in the transverse direction Y of the motor vehicle. By means of the regions 11 hardened in the manner of strips, the trough 1 has increased rigidity in its crash performance. According to the variant embodiment of FIG. 3, the strip-like regions 11 are formed only in the base 3. Non-hardened regions 21 remain in between.

FIG. 4 illustrates an alternative thereto. The strip-like regions 11 are formed continuously here both in the longitudinal direction X of the motor vehicle and in the transverse direction Y of the motor vehicle; consequently, the regions also extend over the respective side wall 4 or end wall 5 and also (illustrated here) the flange 6.

Cross-sectional views according to the intersecting line A-A from FIG. 4 are furthermore illustrated in FIG. 5a and FIG. 5b. According to FIG. 5a, for example, a longitudinal bead 13 can be formed in the base 3, the longitudinal bead extending over the entire length of the base 3 of the trough 1. The longitudinal bead 13 can simultaneously also be the hardened strip-like region 11. It can be seen that the respective side wall 4 extends protruding over the base 3 in a manner oriented in the vertical direction Z of the motor vehicle. In particular, side wall 4 and base 3 are arranged at an angle α of between 80 degrees and 90 degrees to each other.

FIG. 5b shows an alternative variant embodiment to FIG. 5a. A stepped shoulder 14 is formed here in particular in the respective side wall 4. The stepped shoulder 14 is provided in the case in particular of a two-stage shaping and/or for additional stiffening of the side wall 4. The stepped shoulder 14 then preferably extends over the entire length of the respective wall 4, 5.

The stepped shoulder 14 can be designed as a connecting point for a battery and/or transverse strut.

Figure 6:
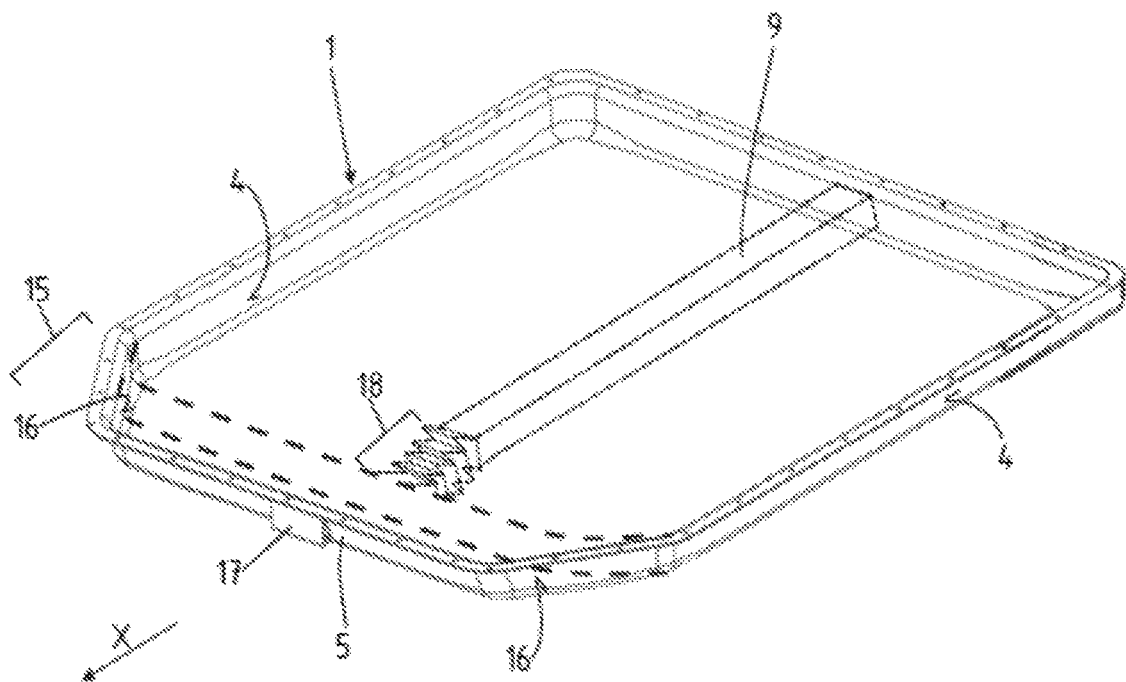
FIG. 6 shows a perspective view of a trough according to the principle of a crash box.

FIG. 6 shows an alternative embodiment of the trough. The trough 1 here is designed in such a manner that a front length portion 15 in the longitudinal direction X of the motor vehicle has a ductile design such that, in a head-on crash, the length portion 15 is deformed in the manner of a crash box and/or by absorbing energy, for example in a manner bent upwards or downwards. For this purpose, a respective front part 16 of the side wall 4 is arranged at an angle to the rest of the side wall 4, and therefore the side walls 4 are oriented pointing towards each other in the front length portion 15 of the trough 1. The side walls are connected via an end wall 5 arranged in the front length portion 15. An adapter 17 or filling piece can likewise be arranged on the outer side, the adapter or filling piece connecting a longitudinal strut 9 arranged in the trough 1 directly to part (not illustrated specifically) of a body or of a chassis. A front part 18 or length portion of the longitudinal strut 9 likewise has a ductile design here such that it deforms in accordance with the principle of a crash box. The wall thickness of the strut can also be formed thinner in the part.

In the front length portion 15, there is no continuous connection between the longitudinal strut 9 and the base 3, in order to permit a deformation behavior in such a manner that the trough 1 is bent away downwards or upwards.

Figure 7:
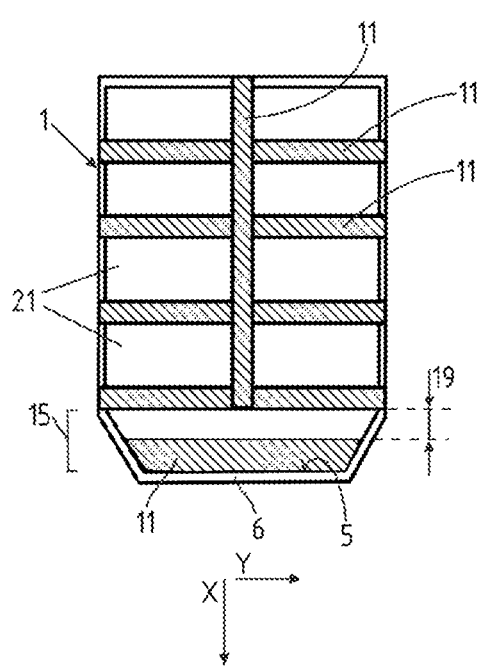
FIG. 7 shows a top view of an alternative of the trough shown in FIG. 6.

FIG. 7 shows a yet another alternative embodiment of the trough 1 in top view. Strip-like regions 11 in the longitudinal direction X and transverse direction Y of the motor vehicle are hardened here. However, the strip-like region 11 which is oriented in the longitudinal direction X of the motor vehicle does not extend as far as the front end wall 5. A spacing 19 is provided, and therefore, in the event of a head-on crash, a corresponding region of the front length portion 15 remains and can be deformed. However, a hardened region 11 is additionally provided here in the base 3, the hardened region extending in the transverse direction, and therefore, in the event of a head-on crash, the front length portion 15 is substantially compressed over the entire width. As a result, crash energy is dissipated and the batteries are effectively protected.

Figure 8:
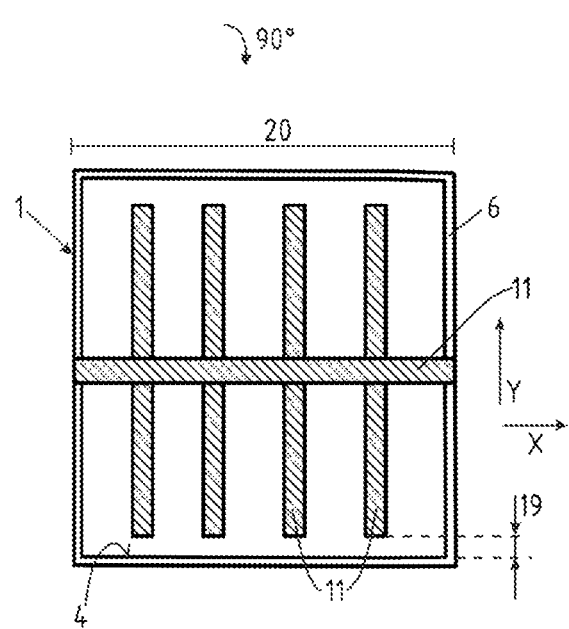
FIG. 8 shows a top view of a trough in accordance with an alternative embodiment; —

FIG. 8 shows yet another exemplary embodiment of the trough. A trough 1 with a strip-shaped region 11 which is formed in the longitudinal direction X of the motor vehicle and extends over the entire length 20 of the trough 1, in particular also over the flange 6, is produced here. However, the strip-shaped hardened regions 11 formed in the transverse direction Y of the motor vehicle extend only over part and are likewise formed here with a spacing 19 from the respective side wall 4. In the event of a side crash, this first of all permits a certain deformability and, in the process, dissipation of crash energy. However, for batteries which are not illustrated specifically, but are arranged in the trough 1, sufficient lateral rigidity is then provided by the locally hardened, strip-shaped regions 11. The strips with hardened regions 11 have a portion of between 30 and 80%, preferably between 40 and 70%, in relation to the overall width of the base.

FIG. 9a shows another exemplary embodiment of the trough 1. The hardened regions 11 are likewise designed here as strip-shaped regions which extend in the transverse direction Y of the motor vehicle. Furthermore, a central hardened region 11 is formed which extends in the longitudinal direction X of the motor vehicle. Between the hardened regions 11, formations 22 which are directed downwards in the vertical direction Z of the motor vehicle are provided in particular in the non-hardened regions 21. The formations are, for example, of cup-shaped design. In the event of beaching or a bollard test, an improved crash performance of the battery carrier 2 can therefore be realized. In accordance with the intersecting lines B-B and A-A, illustrated in FIG. 9b and FIG. 9c, the formations 22 protrude downwards in the vertical direction Z of the motor vehicle in relation to a lower side 23 of the base 3 of the trough 1. In particular, the formations 22 have a ductile design.

FIG. 10a shows an alternative example thereto. The hardened regions 11 are in turn of strip-shaped design and extend in the transverse direction Y of the motor vehicle and in the longitudinal direction X of the motor vehicle. The separation, illustrated in FIG. 9 and FIG. 10, of the strips in the transverse direction Y of the motor vehicle and longitudinal direction X of the motor vehicle serves only for illustrative purposes. In particular, the trough 1 is produced integrally from one material, and the hardened regions 11 are correspondingly integral regions in the trough 1.

In the variant embodiment according to FIG. 10a, formations 22 which are directed downwards in the vertical direction Z of the motor vehicle are likewise provided. However, the formations are formed in the entirety of the non-hardened regions. Therefore, no cup-shaped formations are provided here, but rather formations which are rectangular in cross section, and therefore all of the non-hardened regions protrude downwards in the vertical direction Z of the motor vehicle in relation to a lower side 23 of the base 3, illustrated in FIG. 10b and FIG. 10c.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A battery carrier for arranging on an electric motor vehicle, the battery carrier comprising:
   a trough for receiving at least one battery,
     wherein the trough is produced in the form of a formed sheet-metal component deep-drawn from a hardenable steel material with a base and walls arranged at an angle to the base, and
     wherein load paths arising in the trough are hardened locally, and/or connecting points for struts arranged in the trough are hardened locally; and
   a plurality of longitudinal beads and/or transverse beads formed in the base,
     wherein the longitudinal beads and/or transverse beads are the locally hardened regions.

2. The battery carrier of claim 1, wherein the trough is produced by hot forming and press hardening such that the locally hardened regions are formed in the trough.

3. The battery carrier of claim 2, wherein downwardly directed formations are provided in the base.

4. The battery carrier of claim 3, wherein the locally hardened regions are of strip-shaped design.

5. The battery carrier of claim 1, wherein the locally hardened regions extend transversely and/or longitudinally over the trough.

6. The battery carrier of claim 1, wherein the locally hardened regions have a tensile strength Rm of greater than 1300 MPa.

7. The battery carrier of claim 6, wherein the remaining non-hardened regions have a tensile strength Rm of between 500 MPa and 1000 MPa.

8. The battery carrier of claim 1, wherein
   the locally hardened regions are formed only in the base, or
   the locally hardened regions are formed in the base and in the walls and in a laterally protruding flange.

9. The battery carrier of claim 1, further comprising a stepped shoulder formed in at least one of the walls.

10. The battery carrier of claim 1, wherein
    the walls of the trough converge with each other in an angled manner in a front part in the longitudinal direction of the motor vehicle, and
    the walls are arranged pointing towards each other at an angle of 30 to 60 degrees and are connected to each other via a front end wall.

11. The battery carrier of claim 1, wherein the locally hardened regions have a tensile strength Rm of greater than 1450 MPa.

12. The battery carrier of claim 11, wherein the remaining non-hardened regions have a tensile strength Rm of between 500 MPa and 1000 MPa.

13. The battery carrier of claim 11, wherein the remaining non-hardened regions have a tensile strength Rm of between 550 MPa and 750 MPa.

14. The battery carrier of claim 1, wherein the locally hardened regions have tensile a tensile strength Rm of greater than 1750 MPa.

15. A battery carrier for arranging on an electric motor vehicle, the battery carrier comprising:
    a trough for receiving at least one battery,
      wherein the trough is produced in the form of a formed sheet-metal component deep-drawn from a hardenable steel material with a base and walls arranged at an angle to the base, and
      wherein load paths arising in the trough are hardened locally, and/or connecting points for struts arranged in the trough are hardened locally; and
    a longitudinal strut or transverse strut arranged in the trough spaced apart from the walls.

* * * * *